Patented Dec. 29, 1942

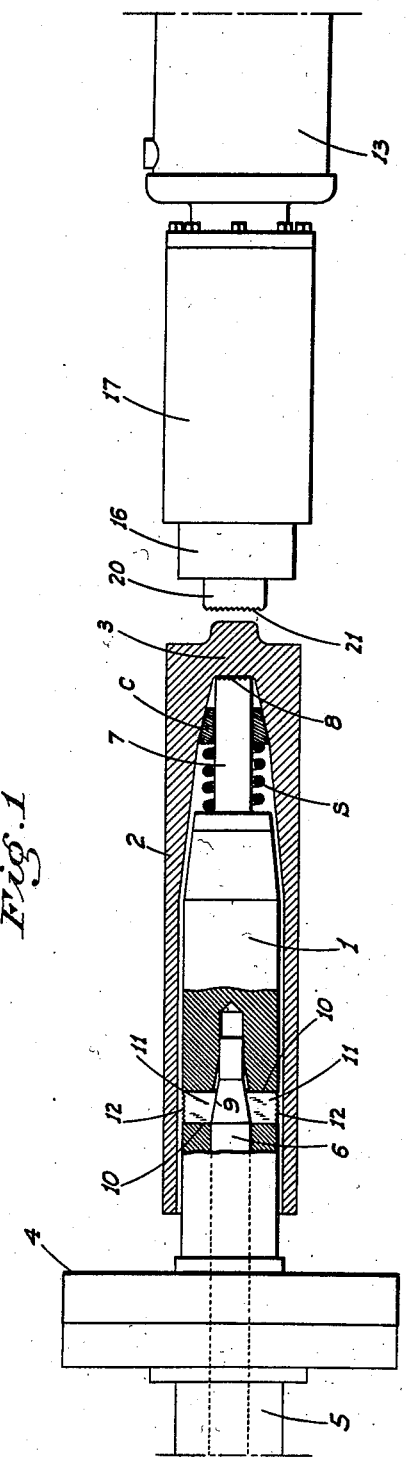
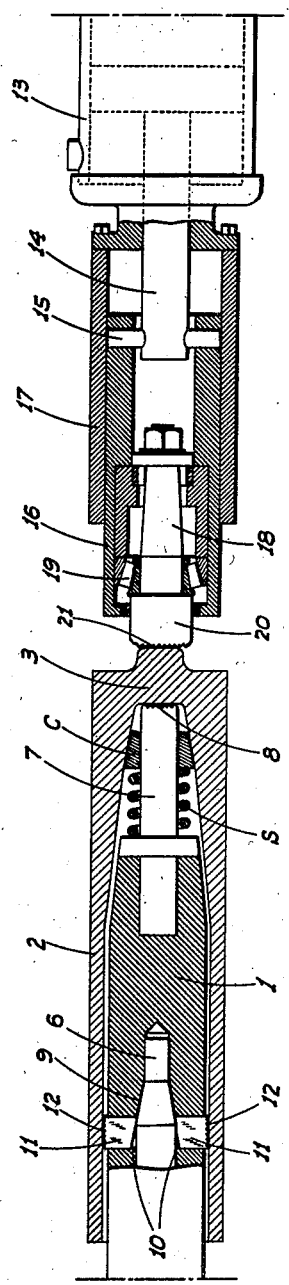

2,306,735

UNITED STATES PATENT OFFICE 2,306,735

LATHE

Robert G. Le Tourneau, Peoria, Ill., assignor to R. G. Le Tourneau, Inc., a corporation of California Application April 18, 1941, Serial No. 389,132

2 Claims. (Cl. 82—44)

This invention relates in general to an improvement in lathe mechanism, and in particular the invention is directed to a unique headstock and tailstock assembly, and especially the work centering and supporting portions thereof.

One of the objects of the invention is to provide a tailstock which includes an element to engage and hold the work centered without the use of a conventional center pin and without the necessity of boring a taper seat in the adjacent end of the work.

Another object of the invention is to provide a headstock and tailstock assembly operative to automatically center and support tubular work which is closed at one end, such as metal shell cases, for the purpose of machining the outside thereof.

An additional object of the invention is to provide a headstock and tailstock assembly as in the preceding paragraph which is high speed in operation whereby to minimize the time required to clamp the work in place for machining, and to release the work from clamped position.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation of the assembly with the work in place but before engagement by the tailstock. the work engaging portion of the headstock being shown in section.

Figure 2 is a sectional elevation showing the work as centered and clamped in position for outside machining.

Referring now more particularly to the characters of reference on the drawing, the headstock of the lathe includes a mandrel portion 1 which is of substantial length and exteriorally symmetrical to the interior of the work into which it projects. In the present instance, the work is a metal shell case 2 closed at its outer end 3.

The mandrel at its outer end is fixed rigid with a head plate 4 adapted to be secured against the face plate of the rotary driven spindle 5 of the lathe. A thrust rod 6 is slidably and non-turnably mounted in the spindle 4 and projects some distance into the mandrel; such rod being advanced and retracted by suitable power means (not shown).

The end of the mandrel opposite plate 4 is fitted with an axially projecting collar pin 7, the outer end of which is knurled as shown at 8 and which is adapted to seat against the closed end 3 of the work. Pin 7 carries a sliding or work centering collar C of a diameter and configuration to smoothly engage the interior of the work before the end of the pin seats against the end of the work. A compression spring surrounds the pin 7 between the mandrel and collar C, such spring being under compression when the collar is in engagement with the work. This collar pin unit, in effect, serves as the live center of the headstock.

Within the mandrel, the thrust rod 6 is formed with an annular taper shoulder 9 which tapers down in a direction away from plate 4; the mandrel in the radial plane of said shoulder being radially slotted at circumferentially spaced points, as at 10, for sliding reception of a plurality of jaws 11 which are heavily knurled at their outer ends as at 12.

It will be seen that when the work 2 is slipped over mandrel 1 and axial movement applied to the end 3 of the work by the tailstock, as will hereinafter appear in detail, the centering collar C first engages the work and then the end 8 of pin 7 abuts against said end 3 of the work. Thereafter the rod 6 is moved axially in a direction to cause taper shoulder 9 to urge jaws 11 radially outward into engagement with the work; such engagement of the jaws together with engagement of collar C with the work automatically centering the latter.

The tailstock comprises an air actuated power cylinder 13 mounted on the tailstock slide (not shown) with the piston rod 14 projecting toward and in axial alinement with collar pin 7. The outer end of piston rod 14 is pinned at 15 to the inner end of a plunger 16 which is mounted for reciprocation in a rigid tubular housing or sleeve 17 which is open at its outer end and fixed at its inner end with cylinder 13 by suitable means.

The center pin 18 of the tailstock is suitably mounted for rotation in the outer end portion of the plunger 16 by means of a combined annular and thrust bearing 19 of anti-friction type, such center pin having an enlarged work engaging head 20 projecting axially beyond the plunger. This head is formed with a flat, heavily knurled, work-engaging face 21. When power cylinder 13 is actuated so as to advance plunger 16 and head 20 toward, and face 21 into engagement with, the work, the end 3 of the latter is firmly clamped between said face 21 and collar pin 7 but only after the resulting axial movement of the work seats collar C as previously described.

By reason of the described assembly, no taper seat is needed in the work, and the work can be rapidly and effectively centered and clamped in place; the action of jaws 11 and collar C assuring proper centering. As the face 21, pin 7, and jaws 11 are knurled at the point of work engagement, the work is frictionally engaged and cannot slip from correct or centered position during the machining operation.

Placement and removal of the work on mandrel 1 is accomplished without obstruction by the tailstock as the latter is hinged for swinging movement out of the path of the work.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a lathe for outside machining of tubular work closed at one end, the bore of the work adjacent said end tapering toward the latter; a driven mandrel adapted to engage within the work, an axial pin projecting from the free end of the mandrel, a work engaging and centering collar slidably mounted on the pin, a compression spring about the pin between said collar and adjacent end of the mandrel, the periphery of said collar being tapered to matchingly engage the taper portion of said bore upon movement of the work onto the mandrel, and means to then clamp the mandrel and work against axial separating movement.

2. In a lathe for outside machining of tubular work closed at one end, the bore of the work adjacent said end tapering toward the latter; a driven mandrel adapted to engage within the work, an axial pin projecting from the free end of the mandrel, a work engaging and centering collar slidably mounted on the pin, a compression spring about the pin between said collar and adjacent end of the mandrel, the periphery of said collar being tapered to matchingly engage the taper portion of said bore upon movement of the work onto the mandrel, and means to then clamp the mandrel and work against axial separating movement, the collar being of a diameter to engage said bore short of said closed end of the work and before said pin engages said end.

ROBERT G. LE TOURNEAU.